United States Patent
Igaki et al.

(10) Patent No.: US 7,043,054 B2
(45) Date of Patent: May 9, 2006

(54) POSTAL INFORMATION INPUT APPARATUS AND A DATA DISPLAY METHOD THEREOF

(75) Inventors: Masahiko Igaki, Kanagawa (JP); Tadashi Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 713 days.

(21) Appl. No.: 09/812,105

(22) Filed: Mar. 19, 2001

(65) Prior Publication Data

US 2001/0024511 A1 Sep. 27, 2001

(30) Foreign Application Priority Data

Mar. 21, 2000 (JP) ............................. 2000-079038

(51) Int. Cl.
*G06K 9/00* (2006.01)

(52) U.S. Cl. ...................... 382/101; 382/175; 345/565

(58) Field of Classification Search ........ 382/101–103, 382/112, 140, 175, 181, 219, 231, 310, 321, 382/189, 282, 290, 305; 700/226; 209/546; 271/122, 153; 345/656, 829, 162, 566, 565; 348/177, 180, 169; 385/1.18
See application file for complete search history.

(56) References Cited

U.S. PATENT DOCUMENTS

| | | | |
|---|---|---|---|
| 4,632,252 A | * 12/1986 | Haruki et al. ................ | 209/546 |
| 4,641,753 A | 2/1987 | Tamada | |
| 5,697,504 A | * 12/1997 | Hiramatsu et al. .......... | 209/546 |
| 5,971,391 A | * 10/1999 | Salomon et al. ............ | 271/153 |
| 6,003,857 A | * 12/1999 | Salomon et al. ............ | 271/122 |
| 6,327,373 B1 | * 12/2001 | Yura .......................... | 382/101 |
| 6,333,791 B1 | * 12/2001 | Okimoto et al. ........... | 358/1.18 |
| 6,370,446 B1 | * 4/2002 | Divine ....................... | 700/226 |
| 6,509,976 B1 | * 1/2003 | Law et al. .................. | 358/1.18 |
| 6,587,572 B1 | * 7/2003 | Suchenwirth-Bauersachs et al. ........ | 382/101 |

FOREIGN PATENT DOCUMENTS

| EP | 1 047 024 A2 | 10/2000 |
|---|---|---|
| JP | 8-243507 | 9/1996 |
| JP | 10-85674 | 4/1998 |

* cited by examiner

*Primary Examiner*—Kanjibhai Patel
*Assistant Examiner*—Seyed Azarian
(74) *Attorney, Agent, or Firm*—Dickstein, Shapiro, Morin & Oshinsky, LLP.

(57) ABSTRACT

In a postal information input apparatus in which when a postcode to be read by a reader of a postal matter sorting machine cannot be normally read, a correct postcode is reentered manually from an input device, a first display means which displays on a display device of the input apparatus a first display so as to indicate that the postal information input apparatus receives a data to be input from the postal matter sorting machine, and also displays an unprocessed number in the postal information input apparatus, is provided.

18 Claims, 4 Drawing Sheets

POSTAL INFORMATION INPUT APPARATUS AND A DATA DISPLAY METHOD THEREOF

BACKGROUND OF THE INVENTION

1. Field of the Invention

The present invention relates to an information input apparatus for a postal matter sorting machine and a data display method thereof, and in particular, relates to an information input apparatus that enables letting an operator recognize the processing speed necessary for on-line processing of the postal matter sorting machine, and a data display method thereof.

2. Description of the Related Art

A postal information input apparatus of a conventional postal matter sorting machine is constructed such that when the postcode is not read normally by the OCR, the correct postcode is reentered manually, thereby enable again sorting of a mail.

In such a conventional system, several images are received ahead, so as to perform preparation such as screen creation or the like for preparing next key stroke, in order to improve the processing speed.

In the on-line processing system, however, when the image that has received ahead becomes time out, that is, if input has not been finished within a predetermined time, the data struck by keys is discarded without being used. As a result, the data must be re-entered.

In view of the above-described situation, an efficient key striking method has been desired for reducing occurrence of time out. With the above-described conventional method, however, there are problems as described below.

A first problem is that a key striker cannot recognize the occurrence of time out, and as a result, the key striker cannot recognize properly his/her own key striking speed. That is because a mechanism for informing the key striker that time out has occurred is not provided.

A second problem is that the key striker cannot recognize the number of mails that have been received and held. That is because a mechanism for informing the key striker of the number of mails that have been received and held is not provided.

In any case, the problem is, in general, that information to the key striker is little, and by recognizing the occurred situation, the current situation has to be understood from the behind.

In the Japanese Patent (KOKOKU) No. 62-6870, a postcode input apparatus for a postal matter sorting machine is disclosed. This apparatus, however, does not solve above-noted problem.

SUMMARY OF THE INVENTION

The object of the present invention is to improve the disadvantage in the above-described related art, and in particular, in the input operation of postcodes, to provide a new postal information input apparatus enabling fruitful and efficient input by providing more data to the person who inputs postcodes and a data display method thereof.

In order to achieve the above-described object, the present invention basically adopts such a technical construction as described below.

The first aspect of the present invention is a postal information input apparatus in which when a postcode to be read by a reader of a postal matter sorting machine cannot be normally read, a correct postcode is reentered manually from an input device, wherein a first display means which displays on a display device of the input apparatus a first display so as to indicate that the postal information input apparatus receives a data to be input from the postal matter sorting machine, and also displays an unprocessed number in the postal information input apparatus, is provided.

In the second aspect of the present invention, a second display means for displaying on the display device a second display indicating that if the data to be input cannot be input within a predetermined time, the predetermined time has passed, is provided.

In the third aspect of the present invention, the second display is displayed within a display area of the first display.

In the fourth aspect of the present invention, the first display is an icon display on a display device of the postal information input device.

In the fifth aspect of the present invention, the second display is a display state in which the first display has changed from a first display state of the first display to a second display state thereof.

In the sixth aspect of the present invention, a display deletion means for deleting the first display and the second display, when the data to be input corresponding to the first display is input within a predetermined time, is provided.

Referring to FIG. 1 and FIG. 2, an icon 11 which indicate that there is a received data is displayed on the display 6. This icon indicates the number of data received from the current terminal (FIG. 2(a)), and at the same time, this icon can inform a key striker of occurrence of time out, by reversely displaying the displayed icon (in FIG. 2(b), data corresponding to the left figure in FIG. 2(b) becomes time-out).

Therefore, the operator can recognize the occurrence of time out, and hence can confirm whether the current key-striking speed is adequate or not. As a result, useless operation such as reinput of data or the like can be avoided.

DESCRIPTION OF THE PREFERRED EMBODIMENTS

Specific embodiments of the postal information input apparatus and the data display method according to the present invention will now be described in detail, with reference to the drawings.

Figure 1:
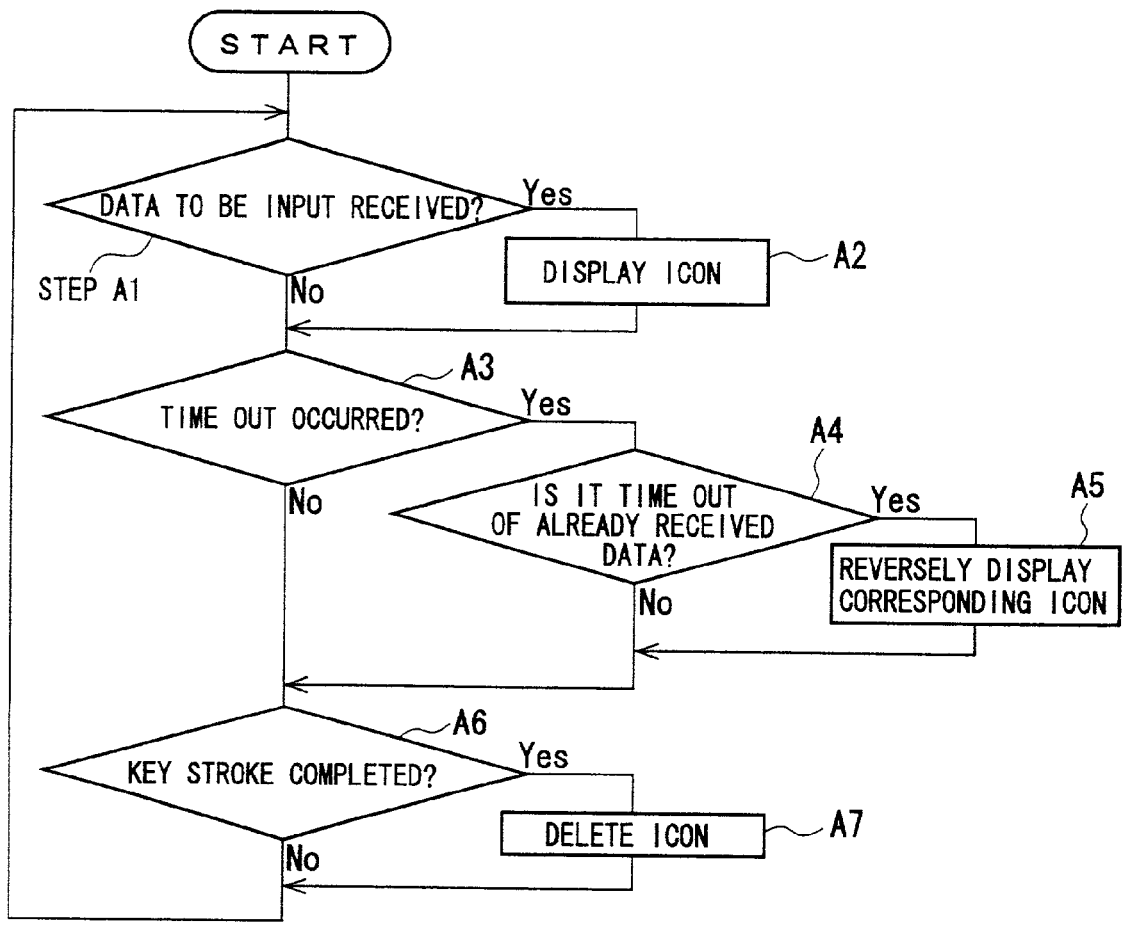
FIG. 1 is a flowchart of a postal information input apparatus according to the present invention.
Figure 2:
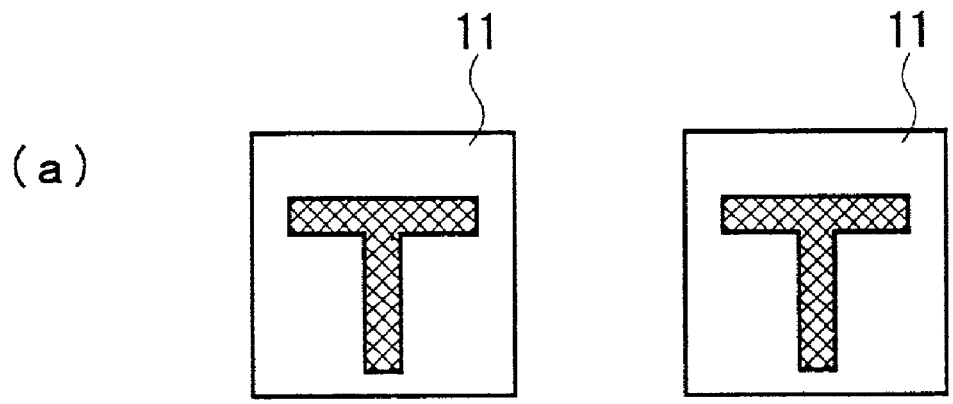
FIG. 2(a) is a diagram showing the state of an icon displayed on the display, on which there are two received unprocessed data.
FIG. 2(b) is a diagram showing the state of an icon displayed on the display, on which the data corresponding to the left figure becomes time-out.
FIG. 2(c) is a diagram showing the state of an icon displayed on the display, on which the time-out data has been input and there remains only one unprocessed data.
Figure 2:
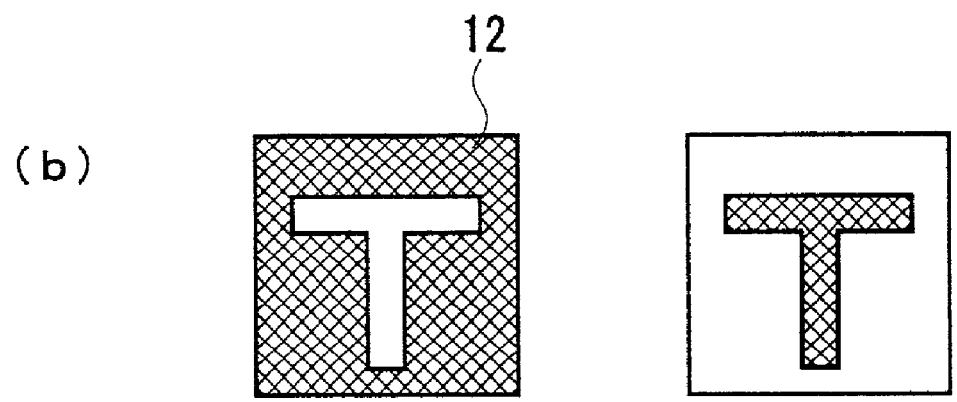
Figure 2:
Figure 3:
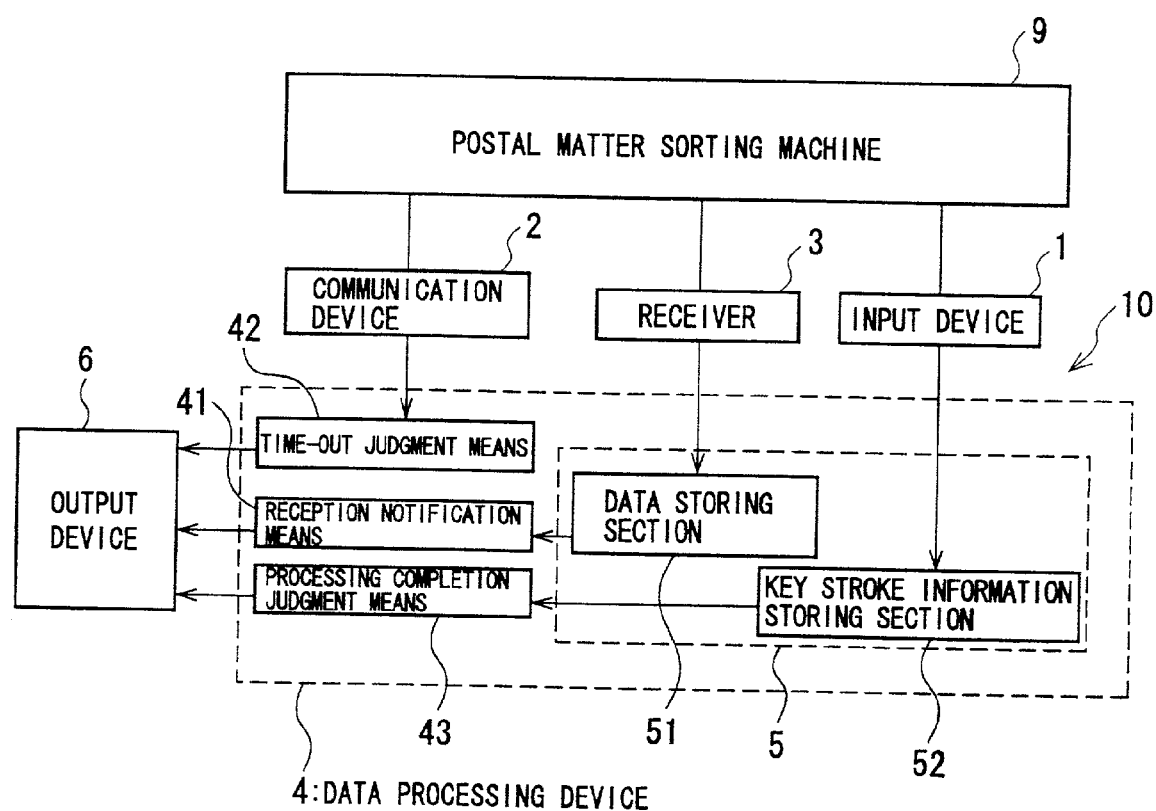
FIG. 3 is a block diagram of a postal information input apparatus according to the present invention.

FIG. 1 is a flowchart showing the operation of the postal information input apparatus according to the present invention. FIG. 2 is a diagram showing the state of an icon displayed on the display, wherein FIG. 2(a) is a diagram showing a state that there are two received unprocessed data, FIG. 2(b) is a diagram showing a state that the data corresponding to the left figure becomes time-out, and FIG. 2(c) is a diagram showing a state that the time-out data has been input and the icon 12 corresponding to the input data is deleted and there remains only one unprocessed data. FIG. 3 is a block diagram of the postal information input apparatus. In these figures, there is shown a postal information input apparatus 10 in which when a postcode to be read by a reader of a postal matter sorting machine 9 cannot be normally read, a correct postcode is reentered manually from the postal information input device 1, wherein a first display means (Step A2) which displays on a display device 6 of the input apparatus 10 a first display 11 so as to indicate that the postal information input apparatus 10 receives a data to be input from the postal matter sorting machine 9, and also displays an unprocessed number in the postal information input apparatus 10, is provided.

Moreover, there is shown a postal information input apparatus characterized in that a second display means (Step A5) for displaying on the display device 6 a second display 12 indicating that if the data to be input cannot be input within a predetermined time, the predetermined time has passed, is provided.

In addition, there is shown a postal information input apparatus characterized in that the second display 12 is displayed within a display area of the first display 11.

There is also shown a postal information input apparatus characterized in that the first display 11 is an icon display on the display 6.

There is also shown a postal information input apparatus characterized in that the second display 12 is a display state in which the first display 11 has changed from a first display state of the first display (for example, a state in the left figure in FIG. 2(a)) to a second display state thereof (for example, a state in the left figure in FIG. 2(b)).

Furthermore, there is shown a postal information input apparatus characterized in that a display deletion means (Step A7) for deleting the first display 11 and the second display 12, when the data to be input corresponding to the first display 11 is input within a predetermined time, is provided.

The present invention will now be described in detail.

Referring to FIG. 3, the present specific embodiment comprises: an input device 1 such as a keyboard or the like; a communication device 2 for performing communication with a postal matter sorting machine 9; a receiver 3 for receiving data such as postcode or the like; a data processing device 4 operating by program control; a memory 5 for storing data; and an output device 6 such as a display or the like. A data storing section 51 stores a plurality of data received from the receiver 3, and a key stroke information storing section 52 holds a character string input by the input device 1.

The data processing device 4 comprises reception notification means 41, time-out judgment means 42, and key stroke completion judgment means 43. When the receiver 3 receives one data, the reception notification means 41 outputs one icon 11 corresponding to the received data to the output device 6. Therefore, FIG. 2 shows that two data to be input have arrived. The time-out judgment section 42 judges whether the stored data in the data storing section 51 has run out of time or not, based on the time-out information received from the postal matter sorting machine 9 via the communication device 2 and the data received from the receiver 3 and held in the data storing section 51, and outputs the information to the output device 6. In the case of time out, as shown by the icon in the left figure of FIG. 2(b), time-out situation is displayed by reversely displaying the icon (in the case of FIG. 2, the colors of the character portion and the background portion of the icon are reversed to be displayed).

The key stroke completion judgment means 43 is monitoring whether input data stored in the key stroke storing section 52 is input. When the key stroke completion judgment means 43 detects that the key stroke is finished, the key stroke completion judgment means 43 deletes the corresponding icon displayed on the output device 6. In FIG. 2(c), the icon in the left figure is deleted, thereby indicate that the input of time-out data has been completed.

The operation of the present invention will now be described with reference to FIG. 1.

At first, it is confirmed if the data to be input from the postal matter sorting machine 9 has been received or not (step A1). At this time, if the data has been received, the icon 11 indicating the reception of data is displayed (step A2).

Next, it is confirmed if time out has occurred or not with respect to the already received data (step A3). If time-out notification has been received, this time-out notification is collated with the already received data (step A4), and if the time-out notification is the notification to the already received data, the corresponding icon is reversed and displayed (step A5). Then, the key stroke is confirmed (step A6), and if key stroke has been completed, the icon corresponding to the data which key stroke has been completed is deleted, and processing of the data reception is again carried out (step A1). In this manner, processing is repeatedly executed.

Figure 4:
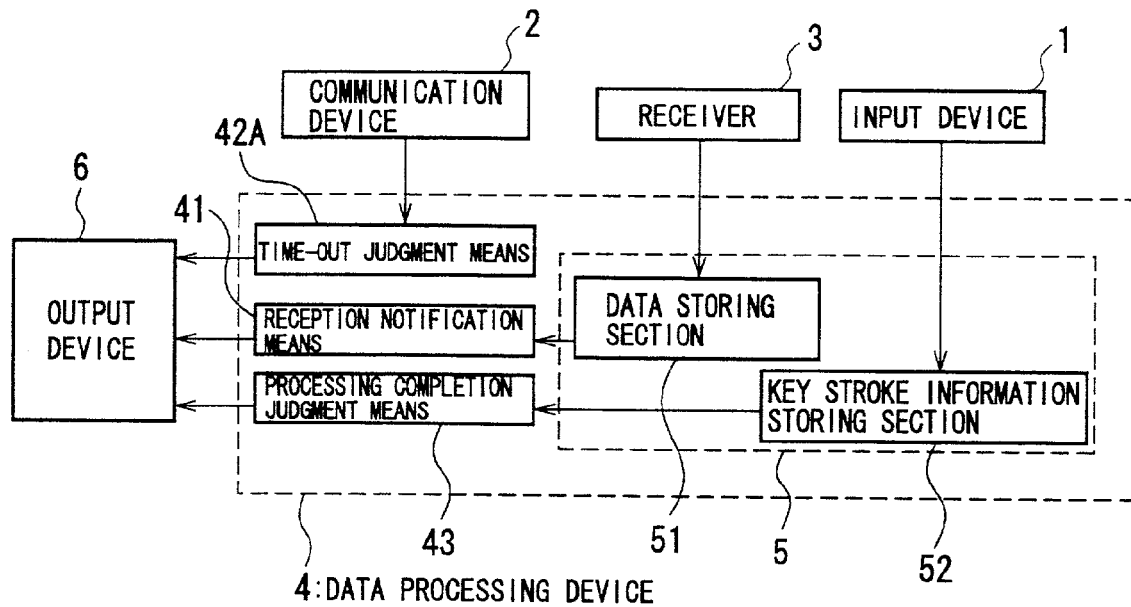
FIG. 4 is a block diagram of another specific embodiment.
Figure 5:
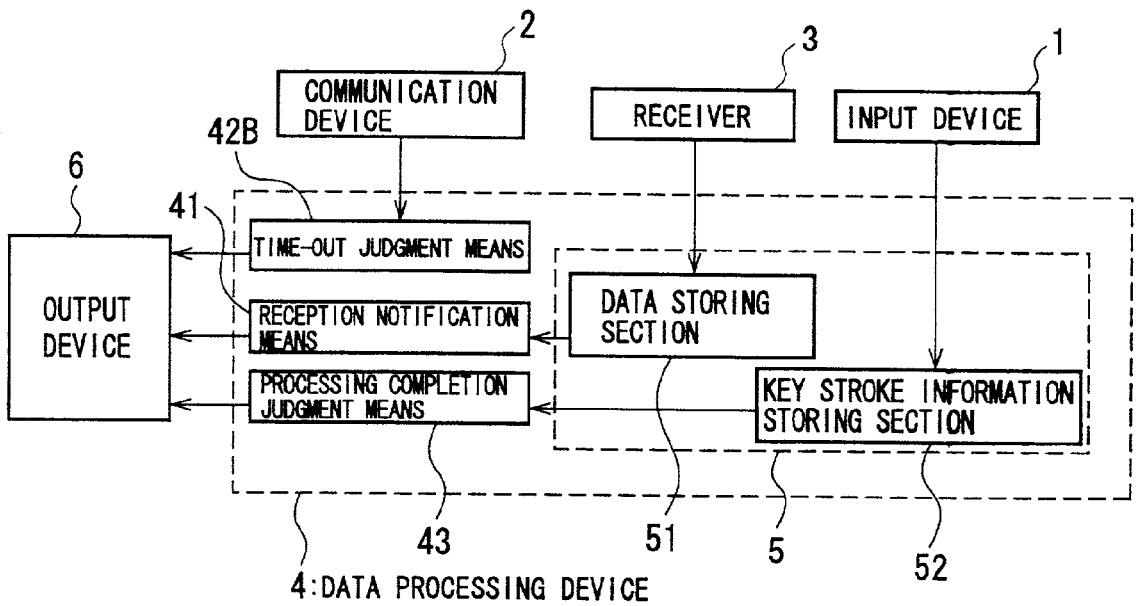
FIG. 5 is a block diagram of the other specific embodiment.

FIG. 4 and FIG. 5 are other embodiments of the present invention.

In the apparatus having the time-out judgment means 42A in FIG. 4, after time-out judgment has been performed as described above, the background color of the icon is changed, thereby display time out of the data to be input.

Moreover, In the apparatus having the time-out judgment means 42B in FIG. 5, after time-out judgment has been performed as described above, character information that indicates time out is output to the output device 6, thereby display time-out of the data to be input.

Alternatively, time out may be displayed by flickering the icon.

As described above, the data display method of the present invention is a data display method of a postal information input apparatus 10 in which when a postcode to be read by a reader of a postal matter sorting machine 9 cannot be normally read, a correct postcode is reentered manually from the postal information input device 1, wherein the method comprising the steps of: receiving a data to be input from the postal matter sorting machine 9 (step A1), displaying on a display device 6 of the postal information input apparatus 10 a first display 11 indicating that the postal information input apparatus 10 receives a data to be input from the postal matter sorting machine 9, upon reception of the data in the step (step A2), displaying on the display device 6 a second display 12 indicating that if the data to be input cannot be input within a predetermined time, the predetermined time has passed (step A5), and deleting the first display 11 and the second display 12 displayed corresponding to the data to be input, when the data to be input being input within the predetermined time (step A7).

In the above description, it is constructed such that the icon is displayed on the display 6, but it maybe displayed using a lamp or the like.

The present invention is constituted as described above, the first effect is that an operator can recognize the processing speed required for the on-line processing.

The second effect of the present invention is that the operator can strike keys corresponding to the situation, since the operator can know the reception condition.

What is claimed is:

1. A postal information input apparatus for manual entry of a corrected postcode, wherein said postcode is unrecognized by a reader of a postal matter sorting machine, comprising:
   a first display which indicates that said postal information input apparatus has received data to be input from said postal matter sorting machine, and
   a second display which indicates that if said data to be input cannot be input within a predetermined time, said predetermined time has passed.

2. A postal information input apparatus according to claim 1, wherein said second display is displayed within a display area of said first display.

3. A postal information input apparatus according to claim 1, wherein said second display is a display state in which said first display has changed from a first display state of said first display to a second display state thereof.

4. A postal information input apparatus in which when a postcode to be read by a reader of a postal matter sorting machine cannot be normally read, a correct postcode is reentered manually from an input device, wherein said postal information input apparatus comprising:
   a first display which indicates that said postal information input apparatus receives a data to be input from said postal matter sorting machine, and also displays a number of unprocessed mail items received by said postal information input apparatus, and
   a second display which is displayed within a display area of said first display and indicates that if said data to be input camiot be input within a predetermined time, said predetermined time has passed.

5. A postal information input apparatus in which when a postcode to be read by a reader of a postal matter sorting machine cannot be normally read, a correct postcode is reentered manually from an input device, wherein said postal information input apparatus comprising:
   a first display which indicates that said postal information input apparatus receives a data to be input from said postal matter sorting machine, and also displays an unprocessed number in said postal information input apparatus, and
   a second display which is a display state in which said first display has changed from a first display state of said first display to a second display state thereof, for displaying said second display state indicating that if said data to be input cannot be input within a predetermined time, said predetermined time has passed.

6. A postal information input apparatus in which when a postcode to be read by a reader of a postal matter sorting machine cannot be normally read, a correct postcode is reentered manually from an input device, wherein said postal information input apparatus comprising:
   a first display which indicates that said postal information input apparatus receives a data to be input from said postal matter sorting machine, and also displays a number of unprocessed mail items received by said postal information input apparatus,
   a second display which indicates that if said data to be input cannot be input within a predetermined time, said predetermined time has passed, and
   a display deletion means for deleting said first display and said second display, when said data to be input corresponding to said first display is input within a predetermined time.

7. A postal information input apparatus in which when a postcode to be read by a reader of a postal matter sorting machine cannot be normally read, a correct postcode is reentered manually from an input device, wherein said postal information input apparatus comprising:
   a first display which indicates that said postal information input apparatus receives a data to be input from said postal matter sorting machine, and also displays an unprocessed number in said postal information input apparatus,
   a second display which is displayed within a display area of said first display, and which indicates that if said data to be input cannot be input within a predetermined time, said predetermined time has passed, and
   a display deletion means for deleting said first display and said second display, when said data to be input corresponding to said first display is input within a predetermined time.

8. A postal information input apparatus in which when a postcode to be read by a reader of a postal matter sorting machine cannot be normally read, a correct postcode is reentered manually from an input device, wherein said postal information input apparatus comprising:
   a first display which indicates that said postal information input apparatus receives a data to be input from said postal matter sorting machine, and also displays an unprocessed number in said postal information input apparatus,
   a second display which is a display state in which said first display has changed from a first display state of said first display to a second display state thereof, for displaying said second display state indicating that if said data to be input cannot be input within a predetermined time, said predetermined time has passed, and
   a display deletion means for deleting said first display and said second display, when said data to be input corresponding to said first display is input within a predetermined time.

9. A data display method of a postal information input apparatus, in which when a postcode to be read by a reader of a postal matter sorting machine cannot be normally read, a correct postcode is reentered manually from an input device, wherein said method comprising the steps of:
   receiving a data to be input from said postal matter sorting machine,
   displaying on a display device of said postal information input apparatus a first display indicating that said postal information input apparatus receives a data to be input from said postal matter sorting machine, upon reception of said data,
   displaying on said display device a second display indicating that if said data to be input cannot be input within a predetermined time, said predetermined time has passed, and
   deleting said first display and said second display displayed corresponding to said data to be input, when said data to be input being input within said predetermined time.

10. A data display method of a postal information input apparatus according to claim 9, wherein said second display is displayed within a display area of said first display.

11. A data method of a postal information input apparatus according to claim 9, wherein said second display is a display state in which said first display has changed from a first display state of said first display to a second display state thereof.

12. A data display method of prompting an operator of a postal information input apparatus to supply a postal code unrecognized by a postal matter sorting machine, comprising:
sending information associated with a rejected mail item whose postal code could not be recognized by the postal matter sorting machine to a postal information input apparatus;
displaying a first indication that information associated with the rejected mail item has, been received by the input apparatus and requires operator input;
displaying a second indication of the number of rejected mail items associated with the information received by the input apparatus requiring operator input;
displaying some or all of the information received on the input apparatus display;
receiving operator input of the correct postcode based on the information displayed; and
displaying a third indication that the operator input has not been received within a predetermined time period.

13. The method of claim 12, wherein said first, second, and third indications are icons.

14. The method of claim 12, wherein the third indication is displayed within a display area of the first indication.

15. A data display method of prompting an operator of a postal information input apparatus to supply a postal code unrecognized by a postal matter sorting machine, comprising:
sending information associated with a rejected mail item whose postal code could not be recognized by the postal matter sorting machine to a postal information input apparatus;
displaying a first indication that information associated with the rejected mail item has been received by the input apparatus and requires operator input;
displaying some or all of the information received on the input apparatus display; and
displaying a second indication that operator input of the correct postcode based on the information displayed has not been received within a predetermined time period.

16. The method of claim 15, further comprising:
deleting the first indication after operator input has been received.

17. The method of claim 15, wherein said first and second indications are icons.

18. The method of claim 15, wherein the second indication is displayed within a display area of the first indication.

* * * * *